United States Patent [19]

Matsuzawa

[11] 4,028,951
[45] June 14, 1977

[54] MOTION TRANSFORMING MECHANISM

[75] Inventor: Nobuyoshi Matsuzawa, Tokyo, Japan

[73] Assignee: Copal Company Limited, Tokyo, Japan

[22] Filed: May 8, 1975

[21] Appl. No.: 575,696

[30] Foreign Application Priority Data

| May 9, 1974 | Japan | 49-52483[U] |
| July 12, 1974 | Japan | 49-82320[U] |
| Nov. 11, 1974 | Japan | 49-136407[U] |

[52] U.S. Cl. .............................................. 74/128
[51] Int. Cl.² ...................................... F16H 27/02
[58] Field of Search ............ 74/128, 142, 143, 30, 74/526, 112

[56] References Cited
UNITED STATES PATENTS

| 755,695 | 3/1904 | Pidgin | 74/128 |
| 1,234,824 | 7/1917 | Tatum | 74/30 |
| 1,565,336 | 12/1925 | Seufert | 74/128 |
| 2,217,881 | 10/1940 | Allen | 74/128 |
| 3,807,254 | 4/1974 | Brakebill | 74/526 |
| 3,818,773 | 6/1974 | Natori | 74/112 |

*Primary Examiner*—Samuel Scott
*Assistant Examiner*—Weeley S. Ratliff, Jr.
*Attorney, Agent, or Firm*—Cushman, Darby & Cushman

[57] ABSTRACT

A motion transforming mechanism which comprises a sliding member, a rack lever supported rotatably on the sliding member and engageable with a driving gear, a trigger lever supported rotatably on said sliding member and engaged with said rack lever and a fixed pin engageable with the rack lever so that the rotation of the driving gear may be positively and accurately transformed to a linear motion of a fixed stroke, the sliding member being utilized to intermittently rotate a ratchet wheel.

6 Claims, 7 Drawing Figures

MOTION TRANSFORMING MECHANISM

BACKGROUND OF THE INVENTION a. Field of the Invention

The present invention relates to motion transforming mechanisms, and more particularly to a motion transforming mechanism formed to transform a rotary motion to a linear motion and to intermittently rotate a rotary member by utilizing the transformed linear motion.

b. Description of the Prior Art

This kind of motion transforming mechanism is utilized for a paper feeding means, for example, of a small printing machine. Most of the conventional motion transforming mechanisms have had defects that the component parts are so many that troubles are likely to occur, that the operation is so unstable that mis-operations are likely to be caused and that the required driving force is so comparatively large that, as a result, not only the entire mechanism must be large but also paper can not be accurately fed.

Summary of the Invention

Therefore, a primary object of the present invention is to provide a motion transforming mechanism which is so simple in the structure as to be adapted to be made small and is accurate and positive in the operation even at a high speed.

Another object of the present invention is to provide a motion transforming mechanism which can be operated with a comparatively small driving force and does not mis-operate even with vibrations and shocks.

These and other objects of the present invention will become more apparent during the course of the following detailed description and appended claims.

DESCRIPTION OF THE PREFERRED EMBODIMENTS

Figure 1:
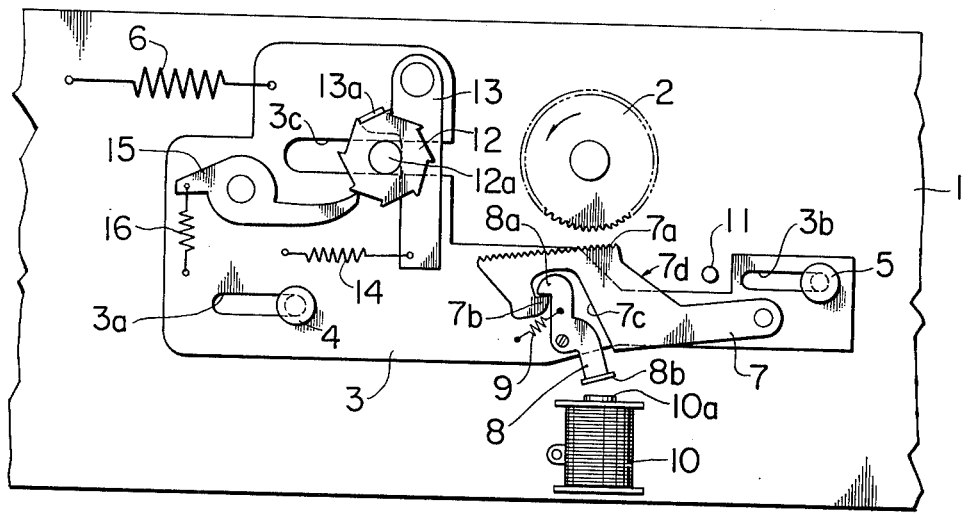
FIG. 1 is a plan view showing an embodiment of the motion transforming mechanism according to the present invention in a stationary state.
Figure 2:
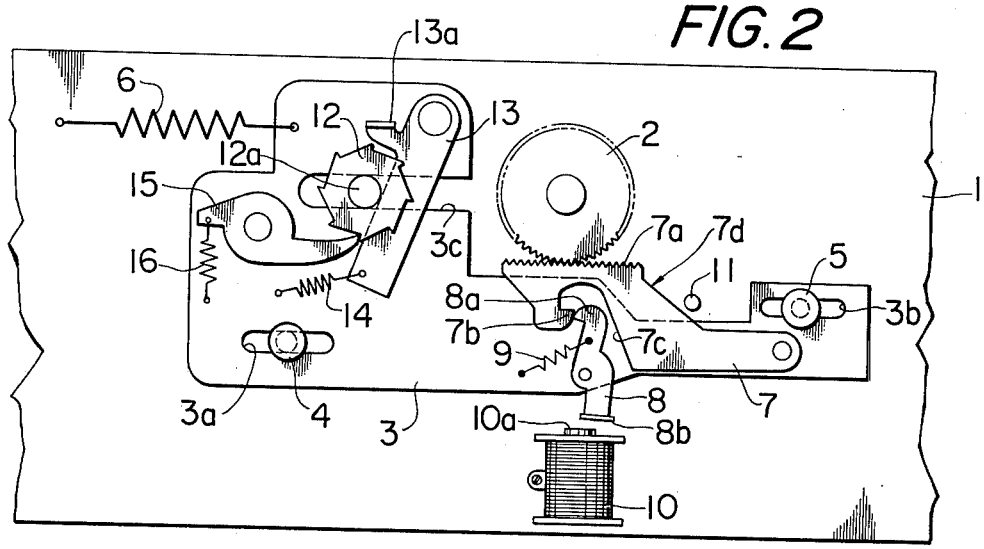
FIG. 2 is a plan view showing the mechanism shown in FIG. 1 in the course of the operation.
Figure 3:
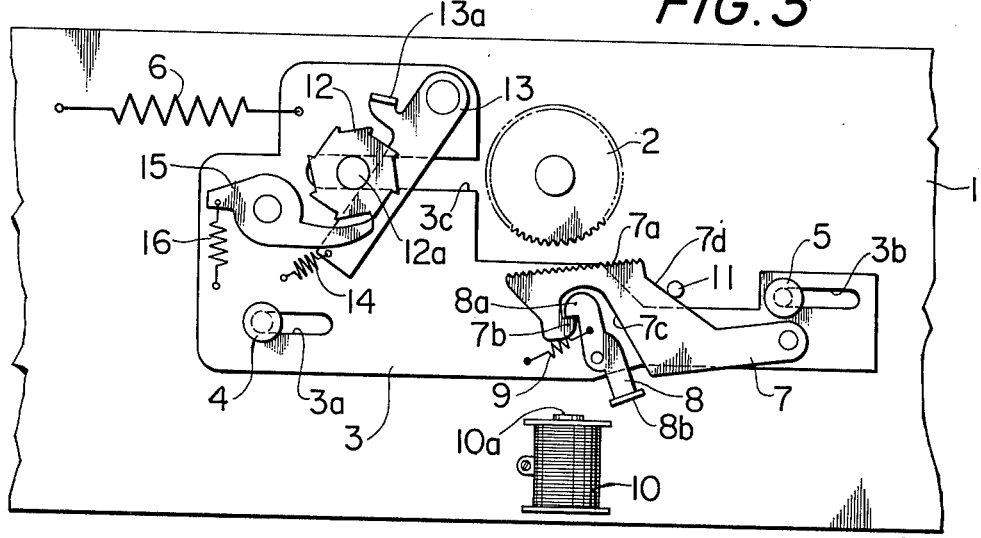
FIG. 3 is a plan view showing the mechanism shown in FIG. 1 just as it has completed the first half of the operation.

With reference to FIGS. 1 to 3, reference numeral 1 signifies a base plate, numeral 2 signifies a driving gear rotatably supported on the base plate 1, numeral 3 signifies a sliding plate having slots 3a, 3b and 3c and slidably mounted on the base plate 1 by pins 4 and 5 fixed to the base plate respectively through the slots 3a and 3b, numeral 6 signifies a spring biasing the sliding plate 3 leftward in the drawing, numeral 7 signifies a rack lever supported rotatably on the sliding plate 3 and having a rack portion 7a engageable with the driving gear 2, hook portion 7b and sloped surfaces 7c and 7d, numeral 8 signifies a trigger lever supported rotatably on the sliding plate 3 and having a hook portion 8a engageable with the hook portion 7b of the rack lever and a bent portion 8b, numeral 9 signifies a spring biasing the trigger lever 8 counterclockwise in the drawing, numeral 10 signifies an electromagnet fixed on the base plate 1 and having a magnetic pole 10a arranged so as to be adjacent to the bent portion 8b of the trigger lever 8 and numeral 11 signifies such member as a pin provided on the base plate 1 and engageable with the sloped surface 7d of the rack lever 7.

Numeral 12 signifies a ratchet wheel secured to a rotary shaft borne rotatably on the base plate 1 and projected through the slot 3c in the sliding plate 3, numeral 13 signifies a holding lever supported rotatably on the sliding plate 3 and having a bent portion 13a engageable with the teeth of the ratchet wheel 12, numeral 14 signifies a spring to bias the holding lever clockwise in the drawing, numeral 15 signifies a ratchet lever supported rotatably on the sliding plate 3 and having a tip portion 15a engageable with the teeth of the ratchet wheel 12 and numeral 16 signifies a spring biasing the ratchet lever 15 counterclockwise in the drawing.

In the above mentioned mechanism, when the trigger lever 8 is rotated clockwise from the position in FIG. 1, the rack lever 7 will be rotated clockwise in the drawing so that the rack portion 7a may be engaged with the driving gear 2 and, once the rack portion 7a engages with the driving gear 2, the engagement will be maintained unless an external force is applied. The ratchet lever 15 is so designed as to be able to rotate the ratchet wheel 15 counterclockwise in the drawing by one tooth, that is, by one pitch while the sliding plate 3 is moved rightward in the drawing by a fixed distance from the position in FIG. 1. Further, when the sliding plate 3 is moved rightward in the drawing from the position in FIG. 1, the holding lever 13 will be rotated clockwise and, even in case its bent portion 13a disengages from the ratchet wheel 12, the rotary shaft 12a will be pressed by the side surface of the holding lever 13 so that the ratchet wheel 12 may be prevented from idly rotating.

The operation of the above mentioned motion transforming mechanism, for example, in the case that it is utilized as a paper feeding means for a small printing machine shall be explained in the following.

When the printing machine is placed in an operating condition, the driving gear 2 will continue to rotate in the direction indicated by the arrow in FIG. 1 but, when the printing operation by one line on paper not illustrated ends, the electromagnet 10 will be momentarily energized by a printing end signal. By this energization of the electromagnet 10, the trigger lever 8 will be rotated clockwise from the position in FIG. 1 against the spring 9. At this time, the tip portion of the trigger lever 8 will contact and push the sloped surface 7c of the rack lever 7, therefore the rack lever 7 will be rotated clockwise in the drawing and the rack portion 7a will come to engage with the rotating driving gear 2. In such case, the engagement of the rack portion 7a with the driving gear 2 will be maintained unless a counterclockwise rotating force is applied to the rack lever 7 and therefore, simultaneously with the engagement of the rack portion 7a with the driving gear 2, the sliding plate 3 will be moved rightward from the position in FIG. 1 against the spring 6. (See FIG. 2.) In this stage, the electromagnet 10 will have been already de-energized and therefore the trigger lever 8 will tend to be rotated counterclockwise in the drawing by the spring 9 but, as shown in FIG. 2, the outside surface of the hook portion 8a of the trigger lever 8 is in contact with the outside surface of the hook portion 7b of the rack lever 7 and therefore the trigger lever 8 will continue to be held as rotated clockwise by the rightward movement of the rack lever 7. It should be noted that, as the direction of the counterclockwise rotating force of the spring 9 acting on the trigger lever 8 is so made as to substantially coincide with the direction of the line segment connecting the center of rotation of the rack lever 7 with the point of contact of said rack lever 7 with the trigger lever 8, no torque will substantially act on the rack lever 7.

On the other hand, when the sliding plate 3 is moved rightward in the drawing as described above, first of all, the holding lever 13 will be rotated clockwise from the position in FIG. 1 by the spring 14, therefore the bent portion 13a will disengaged from the ratchet wheel 12 and instead the tip portion of the ratchet lever 15 will come to engage with the tooth of the ratchet wheel 12. Therefore, as a result, while the sliding plate 3 is moved further rightward in the drawing, the ratchet wheel 12 will be rotated counterclockwise by the ratchet lever 15. As a paper feeding roller not illustrated is fitted to the rotary shaft 12a, simultaneously with the counterclockwise rotation of the ratchet wheel 12, the paper will be advanced and, when the sliding plate 3 is moved rightward in the drawing by a predetermined amount, that is to say, when the ratchet wheel 12 is rotated counterclockwise by one tooth, the paper will be advanced by an amount corresponding just to the spacing for one printed line.

When the sliding plate 3 is moved rightward in the drawing by the predetermined amount by the driving gear 2 through the rack lever 7, the sloped surface 7d of the rack lever 7 will contact the pin 11, therefore the rack lever 7 will be rotated counterclockwise in the drawing by the last rightward motion of the sliding plate 3 and the rack portion 7a will be forcibly disengaged from the driving gear 2. At this time, the hook portion 7b of the rack lever 7 will slip down along the outside surface of the hook portion 8a while rotating the trigger lever 8 slightly clockwise in the drawing and, at last, the trigger lever 8 will rotate again counterclockwise to be in the state in FIG. 3. On the other hand, at the same time as the rack lever 7 disengages from the driving gear 2, the sliding plate 3 will be returned leftward in the drawing by the spring 6 but, in such case, the holding lever 13 will be rotated counterclockwise while remaining pressed against the peripheral surface of the rotary shaft 12a, further the tip portion of the ratchet lever 15 will pass while lightly in contact with the tooth of the ratchet wheel 12 and therefore the ratchet wheel 12 will not be rotated clockwise. When the sliding plate 3 thus returned to the position in FIG. 1, the bent portion 13a of the holding lever 13 will again engage with the tooth of the ratchet wheel 12, all the elements will return to the state in FIG. 1 and one cycle of the paper feeding operation, that is, one cycle of the motion transforming operation will end.

As evident from the above explanation, the pin 4 and/or 5 will perform a role as of a stopper when the sliding plate 3 returns, therefore the sliding plate 3 will collide with the pin 4 and/or 5 in the last stage of the leftward motion of the sliding plate 3 and will vibrate as a result. By this vibration, even if the rack lever 7 is about to rotate clockwise, the clockwise rotating motion will be prevented by the engagement of the hook portions 7b and 8a and therefore the rack lever 7 will not engage with the driving gear 2.

Figure 4:
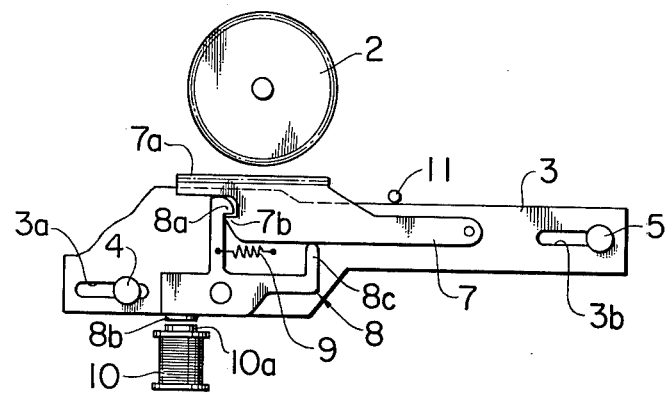
FIG. 4 is a partial plan view showing another embodiment different in the shape of the trigger lever from that in FIG. 3.

FIG. 4 shows another embodiment different in the shape of the trigger lever 8. This embodiment is different from the above mentioned embodiment in respect that a leg portion 8c is added to the trigger lever 8 so that, when the electromagnet 10 is energized to rotate the trigger lever 8 counterclockwise in the drawing, the rack lever 7 will be rotated clockwise by the leg portion 8c.

Figure 6:
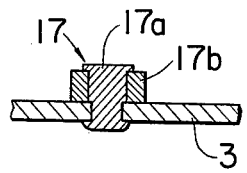
FIG. 6 is a magnified sectioned view of a stopper pin shown in FIG. 5.
Figure 5:
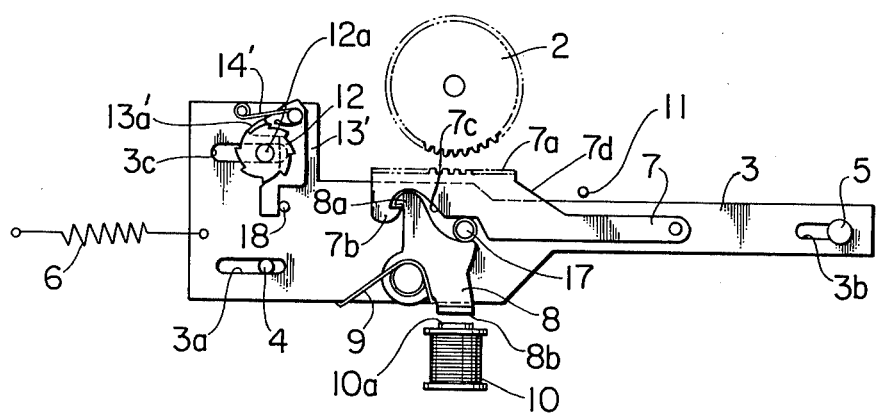
FIG. 5 is a plan view showing still another embodiment different from those in FIGS. 1 and 4 of the motion transforming mechanism according to the present invention.

FIG. 5 shows still another embodiment different from the embodiments shown in FIGS. 1 and 4. In this embodiment, the respective clockwise rotating ranges of the rack lever 7 and trigger lever 8 are restricted by a stopper pin 17 consisting of a shaft 17a erected on the sliding plate 3 and a ring 17b made of such nonmagnetic soft material as rubber fitted to said shaft 17a as shown in FIG. 6 so that, in the stationary state, the rack lever 7 and trigger lever 8 may be always held not to be in contact with each others and, when the motion of the sliding plate 3 ends, the rack lever 7 and trigger lever 8 may be effectively prevented from bounding with the generated shock and vibration. This fact can serve not only to make the electromagnet small and save the electric power consumption by effectively preventing the magnetization of the rack lever with the energization of the electromagnet 10 but also to provide this kind of motion transforming mechanism of a high performance which can always stably operate even at a high speed. Further, the embodiment shown in FIG. 5 is different from the embodiment in FIG. 1 in respect that the holding lever 13 in FIG. 1 is made to have also the function of the ratchet lever 15. That is to say, in FIG. 5, the holding lever 13' is biased counterclockwise by the spring 14' so that, in the stationary state, the bent portion 13a' may engage with the tooth of the ratchet wheel 12 and the end portion may contact a pin 18 secured to the sliding plate 3 to restrict the counterclockwise rotation of said holding lever 13'. Therefore, in this embodiment, when the sliding plate 3 returns, that is, in the course of its leftward motion, the ratchet wheel 12 will be rotated counterclockwise in the drawing by one tooth, that is, by one pitch by the bent portion 13a' of the holding lever 13'.

Figure 7:
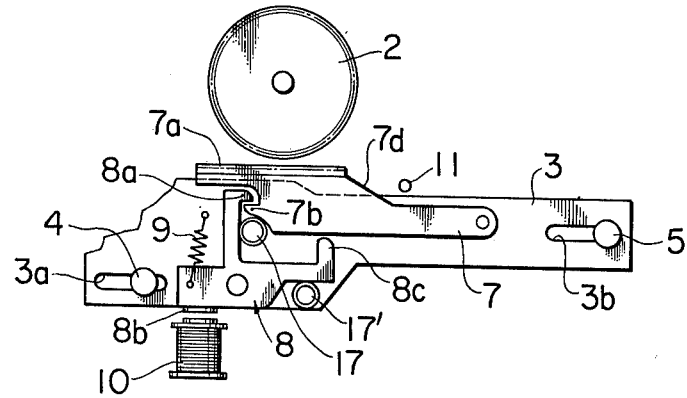
FIG. 7 is a partial plan view showing still another embodiment different from those in FIGS. 1, 4 and 5.

FIG. 7 shows an embodiment somewhat different from the embodiment shown in FIG. 5. In this embodiment, a leg portion 8c is added to the trigger lever 8 so that, when the trigger lever 8 is attracted by the electromagnet 10 so as to be rotated counterclockwise in the drawing, the rack lever 7 may be rotated clockwise by the leg portion 8c and an auxiliary stopper pin 17' to restrict the clockwise rotation of the trigger lever 8 is further provided besides the stopper pin 17. According to this embodiment, as a plurality of stopper pins are provided, the bounding of the rack lever 7 and trigger lever 8 with the shock and vibration generated at the time of the end of the operation of the sliding plate can be more positively prevented.

I claim:

1. A motion transforming mechanism comprising a base plate, a driving gear rotatably borne by said base plate, a sliding plate slidably supported on said base plate, a spring connected between said base plate and sliding plate to bias said sliding plate to its rest position, a rack lever supported rotatably on said sliding plate and having a rack portion capable of meshing with said driving gear, a trigger lever supported rotatably on said sliding plate and engageable with said rack lever, an electromagnet secured on said base plate and capable of attracting said trigger lever, said rack lever being arranged so as to be meshed with said driving gear when said electromagnet is energized with one electric pulse and arranged so as to be disengaged from said driving gear only when said rack lever is pushed by an external force after de-energization of said electromagnet, and a member provided on said base plate and engageable with said rack lever, said rack lever being pushed by said trigger lever with only the force of rotation of said trigger lever and thereby said rack portion being meshed with said driving gear, when said trigger lever is attracted by said electromagnet, said rack portion being disengaged from the driving gear when said rack lever engages with said member, and said rack lever being held as disengaged by said trigger lever and said sliding plate being returned by said spring to its rest position when said rack lever is disengaged from said driving gear;

a ratchet wheel rotatably borne by said base plate, a ratchet lever supported rotatably on said sliding plate and engageable with said ratchet wheel, and a holding lever supported rotatably on said sliding plate and engageable with said ratchet wheel, said holding lever engages with said ratchet wheel while said sliding plate is stationary, and said holding lever is disengaged from said ratchet wheel and said ratchet wheel is rotated by one tooth by said ratchet lever when said sliding plate is moved.

2. A motion transforming mechanism according to claim 1, in which said holding lever has a portion to be pressed against the rotary shaft of said ratchet wheel so as to prevent the idling of said ratchet wheel.

3. A motion transforming mechanism comprising a base plate, a driving gear rotatably borne by said base plate, a sliding plate slidably supported on said base plate, a spring connected between said base plate and sliding plate to bias said sliding plate to its rest position, a rack lever supported rotatably on said sliding plate and having a rack portion capable of meshing with said driving gear, a trigger lever supported rotatably on said sliding plate and engageable with said rack lever, an electromagnet secured on said base plate and capable of attracting said trigger lever, said rack lever being arranged so as to be meshed with said driving gear when said electromagnet is energized with one electric pulse and arranged so as to be disengaged from said driving gear only when said rack lever is pushed by an external force after de-energization of said electromagnet, and a member provided on said base plate and engageable with said rack lever, said rack lever being pushed by said trigger lever with only the force of rotation of said trigger lever and thereby said rack portion being meshed with said driving gear, when said trigger lever is attracted by said electromagnet, said rack portion being disengaged from the driving gear when said rack lever engages with said member, and said rack lever being held as disengaged by said trigger lever and said sliding plate being returned by said spring to its rest position when said rack lever is disengaged from said driving gear;

at least one stopper pin made of a nonmagnetic material and secured to said sliding plate and engageable with said rack lever and trigger lever, said trigger lever and rack lever are held so as not to be in contact with each other by said stopper pin unless said trigger lever is attracted by said electromagnet.

4. A motion transforming mechanism according to claim 3, in which said stopper pin consists of a shaft erected on said sliding plate and a rubber ring fitted to said shaft.

5. A motion transforming mechanism according to claim 3, in which the moving range of said sliding plate is restricted by at least one pin erected on said base plate.

6. A motion transforming mechanism comprising a base plate, a driving gear rotatably borne by said base plate, a sliding plate slidably supported on said base plate, a spring connected between said base plate and sliding plate to bias said sliding plate to its rest position, a rack lever supported rotatably on said sliding plate and having a rack portion capable of meshing with said driving gear, a trigger lever supported rotatably on said sliding plate and engageable with said rack lever, an electromagnet secured on said base plate and capable of attracting said trigger lever, said rack lever being arranged so as to be meshed with said driving gear when said electromagnet is energized with one electric pulse and arranged so as to be disengaged from said driving gear only when said rack lever is pushed by an external force after de-energization of said electromagnet, and a member provided on said base plate and engageable with said rack lever, said rack lever being pushed by said trigger lever with only the force of rotation of said trigger lever and thereby said rack portion being meshed with said driving gear, when said trigger lever is attracted by said electromagnet, said rack portion being disengaged from the driving gear when said rack lever engages with said member, and said rack lever being held as disengaged by said trigger lever and said sliding plate being returned by said spring to its rest position when said rack lever is disengaged from said driving gear;

a holding lever supported rotatably on said sliding plate and having a bent portion engageable with said ratchet wheel, and a stopper secured to said sliding plate to restrict the rotation of said holding lever, said ratchet wheel is rotated by one tooth by said holding lever when said sliding plate is moved.

* * * * *